United States Patent
Chow et al.

(10) Patent No.: US 7,542,924 B2
(45) Date of Patent: *Jun. 2, 2009

(54) BUSINESS PROCESS AND APPARATUS FOR ONLINE PURCHASES USING A RULE-BASED TRANSFERABLE SHOPPING BASKET

(75) Inventors: Kingsum Chow, Hillsboro, OR (US); John Du, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/991,704

(22) Filed: Nov. 18, 2004

(65) Prior Publication Data

US 2005/0131772 A1     Jun. 16, 2005

Related U.S. Application Data

(63) Continuation of application No. 09/538,935, filed on Mar. 31, 2000, now Pat. No. 6,850,899.

(51) Int. Cl.
G06Q 30/00     (2006.01)

(52) U.S. Cl. .................. 705/26; 705/1; 705/27

(58) Field of Classification Search ............ 705/26, 705/27

See application file for complete search history.

(56) References Cited

U.S. PATENT DOCUMENTS

| | | | |
|---|---|---|---|
| 5,956,709 A | 9/1999 | Xue | 707/3 |
| 6,029,141 A | 2/2000 | Bezos et al. | 705/27 |
| 6,101,482 A | 8/2000 | DiAngelo et al. | 705/26 |
| 6,101,485 A | 8/2000 | Fortenberry et al. | 705/36 |
| 6,173,269 B1 | 1/2001 | Solokl et al. | 705/35 |
| 6,266,649 B1 | 7/2001 | Linden et al. | 705/26 |
| 6,405,176 B1* | 6/2002 | Toohey | 705/26 |
| 6,412,012 B1 | 6/2002 | Bieganski et al. | 709/232 |

(Continued)

FOREIGN PATENT DOCUMENTS

EP     1189161     3/2001

(Continued)

OTHER PUBLICATIONS

Hoque, Reaz, "Shopping Cart Application with JavaScript," Web Technique, vol. 3, May 1998.*

(Continued)

*Primary Examiner*—Jeffrey A. Smith
*Assistant Examiner*—Jason B. Dunham
(74) *Attorney, Agent, or Firm*—Pillsbury Winthrop Shaw Pittman LLP

(57) ABSTRACT

An online shopping basket is acquired by a buyer from an online store and is customized according to rules specified by the buyer. The buyer places zero or more items in the online shopping basket(s) before they are given to at least one shopper by the online store. The shopper(s) may further customize the online shopping basket(s) with rules that do not conflict with those specified by the buyer. The shopper(s) then place zero or more items in the online shopping basket(s) and return the basket(s) to the online store. Multiple online shopping baskets are merged into a single basket, and the buyer reviews the items in the merged online shopping basket and adds or removes items as necessary. The buyer then purchases the remaining items from the online store.

12 Claims, 6 Drawing Sheets

U.S. PATENT DOCUMENTS

| | | | |
|---|---|---|---|
| 6,629,079 B1 * | 9/2003 | Spiegel et al. | 705/26 |
| 6,876,977 B1 * | 4/2005 | Marks | 705/26 |
| 7,275,041 B1 * | 9/2007 | Cue et al. | 705/26 |
| 2001/0007099 A1 * | 7/2001 | Rau et al. | 705/26 |
| 2001/0021914 A1 * | 9/2001 | Jacobi et al. | 705/26 |
| 2003/0105682 A1 * | 6/2003 | Dicker et al. | 705/27 |

OTHER PUBLICATIONS

AOL Internet Service Information, printed from website www.AOL.com on Jul. 7, 2003.

* cited by examiner

Location: http://shoppingbasket.com

(Customer_ID2)'s Shopping Basket (Basket_ID)

Items in the Shopping Basket:

| | Description | Unit Price | Quantity | Total Unit Price |
|---|---|---|---|---|
| ☑ (1) | | | | |
| ☐ (2) | | | | |
| ☐ (3) | | | | |
| ☐ (4) | | | | |
| ☐ (5) | | | | |

Total Price: _____ 413

410  [Customize Basket]  [Continue Shopping]  [Remove Item(s)]  [Notify Approver]

BUSINESS PROCESS AND APPARATUS FOR ONLINE PURCHASES USING A RULE-BASED TRANSFERABLE SHOPPING BASKET

RELATED APPLICATIONS

This application is a continuation application of application Ser. No. 09/538,935, filed Mar. 31, 2000, now U.S. Pat. No. 6,850,899.

BACKGROUND

1. Field of the Invention

The present invention relates generally to online shopping via the Internet. More specifically, it relates to a customizable online shopping basket for supporting an online purchasing business process.

2. General Background and Related Art

Most e-commerce Websites (e.g., amazon.com, netgrocer.com) do not adequately address the differences between "shoppers" and "buyers." Shoppers browse Websites for products they are interested in purchasing, but buyers make the actual purchase. "Shoppers" put items in a shopping basket and "buyers" actually purchase the items.

In a physical store, parents can bring their children to a store and allow them to put anything they want into in their own shopping baskets. At the checkout stand, however, all contents contained in each of the baskets are merged to one basket, and during the merging process, a parent can remove any unwanted items. The merging of items between the baskets enables the transfer of the items to the hands of a buyer, who can actually make the purchase. It also enables a transfer of items from a first person that wants to buy something to a second person that decides if the first person needs it.

It is known to send an item chosen by a shopper to another party for purchase of the item. For example, the Dell Online Store for PC purchases <http://gigabuys.us.dell.com/store/index.asp> will allow a person to send a PC system price quote to someone else to view. It does not, however, have the ability to transfer and combine multiple items from other shopping baskets.

It is also known in the art to use an online "wish list" at Websites (e.g., www.amazon.com and www.etoys.com) to let potential buyers know what items a shopper would like to have. A wish list allows buyers to examine and purchase items chosen by a shopper as potential gifts for the shopper. The wish list, however, cannot merge its contents with other wish lists and it cannot be customized.

U.S. Pat. No. 6,029,141, titled "Internet-Based Customer Referral System," issued Feb. 22, 2000, discloses an online shopping cart that allows a customer to select products from multiple different sites, and then perform a single check-out to purchase all of the selected products. The patent says, however, that although the use of a shopping cart provides certain advantages for the invention, other features of the invention, such as the referral tracking and crediting features, are most pertinent and can be implemented without use of a shopping cart. In addition, the shopping cart can not merge its contents with those in other shopping carts and it cannot be customized.

U.S. Pat. No. 5,956,709, titled "Dynamic Data Assembling on Internet Client Side," issued Sep. 21, 1999, also discloses an online shopping cart. The disclosure is exemplary of a method to assemble data into a data set on a client computer that is necessary for performing transactions between an Internet server computer and a client computer. The shopping cart, however, cannot merge its contents with those in other shopping carts and it cannot be customized.

Online e-commerce shopping traditionally has a low basket-to-buy ratio. This means that online baskets are often abandoned before they reach the online checkout stand. One reason for this is that the buyer verbally may disapprove of the shopper's chosen items.

Accordingly, there is a need in the art to allow multiple parties participating in an online purchase to interact with and exert control over items that are purchased.

BRIEF DESCRIPTION OF THE DRAWINGS

The accompanying drawings that incorporate and constitute a part of the Specification, illustrate embodiments of the invention, and, together with the description, explain the objects, advantages, and principles of the invention. In the drawings:

FIG. 4 is a diagram of a web page illustrating a shopper's online shopping basket.

DETAILED DESCRIPTION

The following detailed description refers to the accompanying drawings that illustrate the embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

The present invention is usable with Internet browsers such as Netscape® or Microsoft® Internet Explorer and defines basket customization for shopping baskets used for online shopping. Basket customization is useful for both shoppers and buyers. For example, a parent (the buyer) can give an online shopping basket that is programmed to forbid purchasing of certain toys to their child (the shopper). Conversely, the basket may be programmed to encourage the purchasing of educational books, etc. In a physical store, however, it is the child's responsibility to decide what items to put in a basket. In an online store, the customizable shopping basket of the present invention examines the rules and recommendations of the buyer (e.g., a parent), may refuse undesirable items to be put in the basket by shoppers (e.g., children), and presents desired items in an appropriate manner to be viewed by the buyer.

Figure 1:
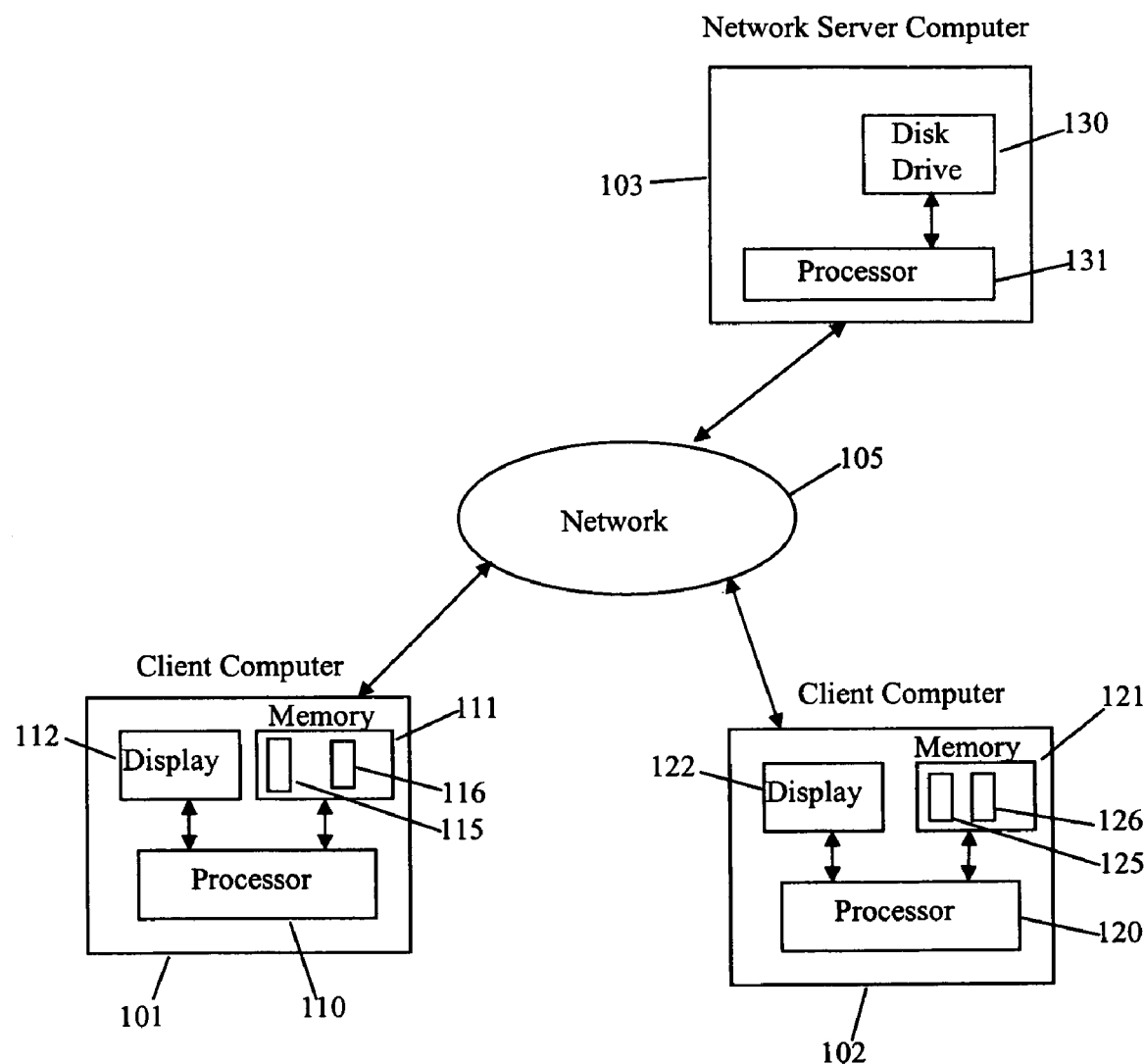
FIG. 1 is an exemplary computer network on which the present invention may be implemented.

FIG. 1 is a diagram illustrating an exemplary computer network on which the present invention may be implemented. The computer network includes a first client computer (101), a second client computer (102), and a network server computer (103) but may include additional client or server computers as necessary or as known in the art. Computers (101), (102), and server (103) are each connected to computer network (105). Network (105) may be, for example, the Internet but may also include other computer communication devices known in the art.

As shown, computer (101) includes a processor (110) operatively coupled to a computer memory (111) and a display (112). Processor (110) executes program instructions, such as Internet browser (115) or e-mail program (116), stored in computer memory (111). Information intended for the computer user may be displayed by processor (110) on display (112). Computer (102) similarly includes a processor (120) operatively coupled to a computer memory (121) and a display (122). As with memory (111) of computer (101), memory (121) of computer (102) may also include a client Internet browser, labeled as program (125), and an e-mail program, labeled as program (126).

Computers (101) and (102) may either accept program instructions from a computer storage device (e.g., optical or magnetic disk) or from network (105). BIOS code (i.e., computer instructions) causing the system to implement the disclosed techniques may be programmed into a non-volatile portion of computer memory (111) or (121). The BIOS may be programmed when the system is manufactured or later delivered via a computer readable medium.

Computers (101) and (102) can be any of a number of well-known computer systems, such as a personal computer based on processors from Intel® Corporation, of Santa Clara, Calif., or Macintosh® computer based on processors from Motorola®, Inc., of Motorola, Ill. More generally, computers (101) and (102) may be any type of computing platform known in the art connected to a network that interacts with application programs, such as a personal digital assistant or a "smart" cellular telephone or pager.

Network server computer (103) can also be any one of a number of well-known server computer systems or network of sever computer systems. Server (103) includes a data storage device, such as disk drive (130), for storing data transferred from computers (101) or (102). Additionally, server (103) includes a processor (131) for executing programs that communicate with computers (101) or (102) to perform the data transfers. In particular, server (103) implements a business to consumer web site that allows online shopping using multiple transferable online shopping baskets consistent with the present invention.

Figure 2:
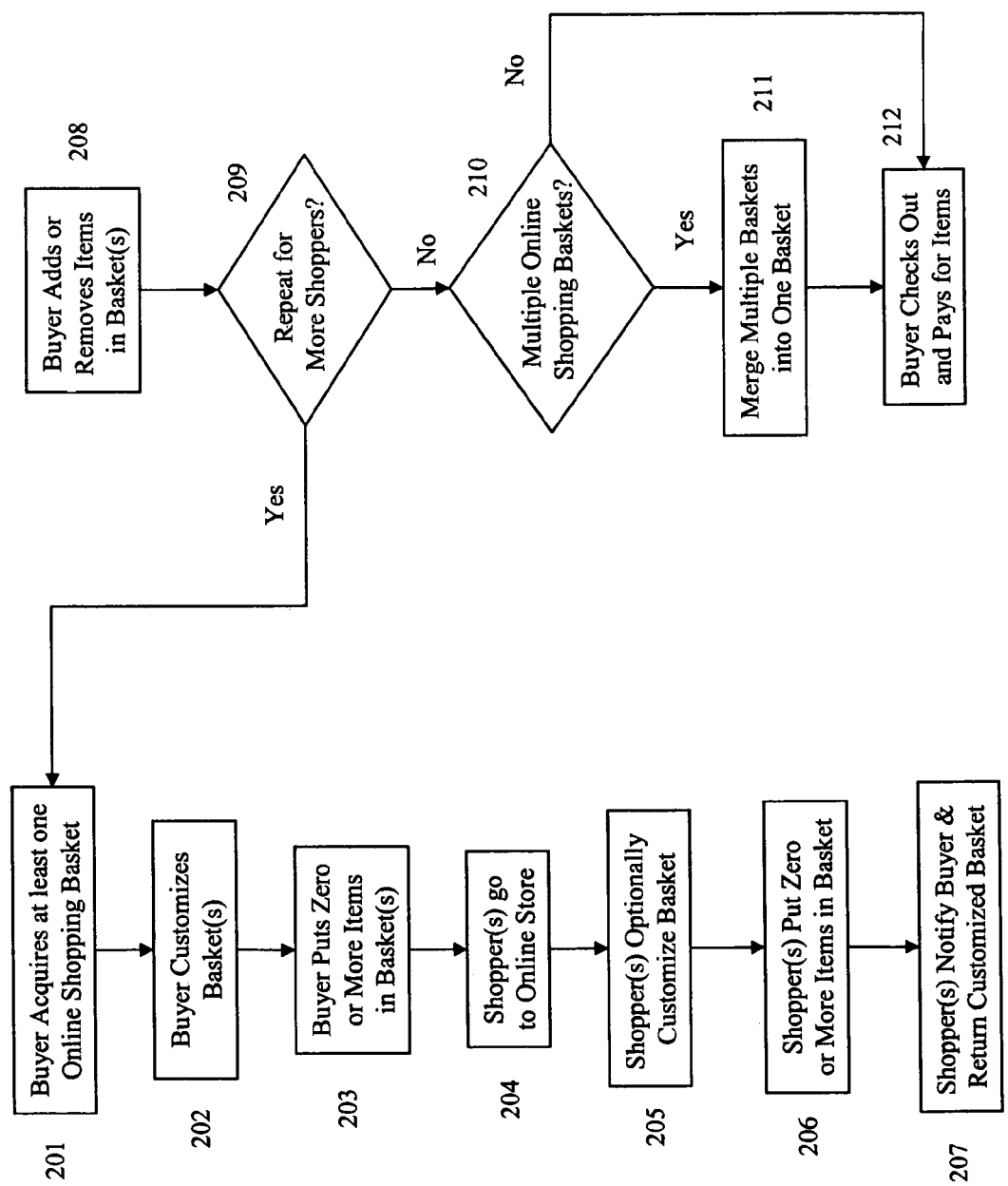
FIG. 2 is a flow chart illustrating a method of using multiple online shopping baskets of the present invention.

FIG. 2 is a flow chart illustrating a method of using multiple online shopping baskets with multiple networked computers. First, a buyer using client computer (101) is assigned a unique customer identification (ID) variable (i.e., Customer_ID1, Mr. Allan Smith) from server computer (103) and acquires from an online store at server computer (103) at least one online shopping basket, each with a unique basket ID (i.e., Basket_ID1, Allan's basket_1) (201). Accordingly, buyers may acquire multiple shopping baskets, and the online store at server computer (103) keeps a record of each shopping basket assigned to each buyer (i.e., Basket_ID1 is assigned to Customer_ID1).

Figure 3:
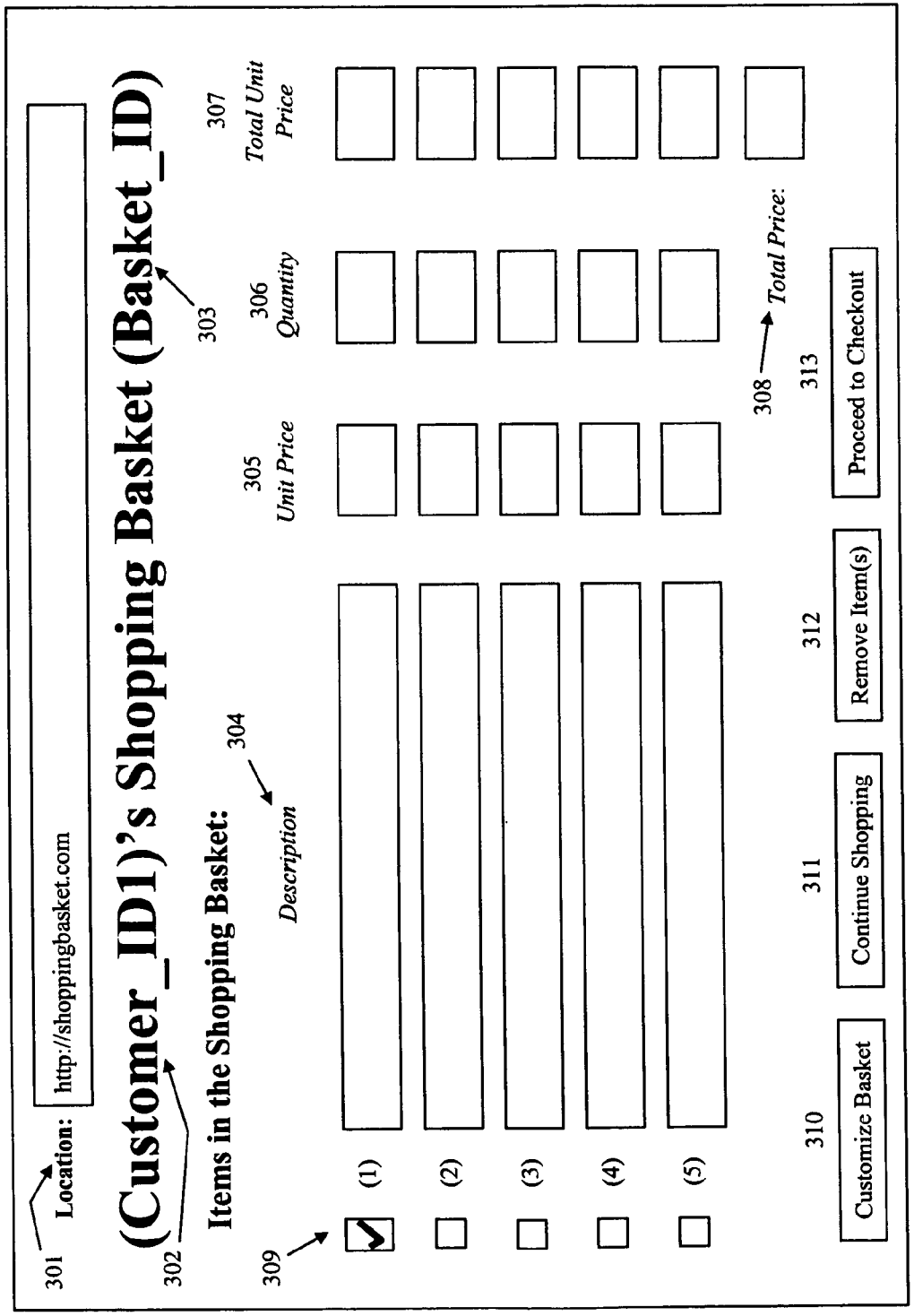
FIG. 3 is a diagram of a web page illustrating a buyer's online shopping basket.

FIG. 3 is a diagram of a web page illustrating a buyer's online shopping basket stored at server computer (103). The web page contains the universal resource locator (URL or Internet address) or domain name server (DNS) of the server computer (103) to identify its location (301) on the Internet, the buyer's ID or name (shown as Customer_ID1) to identify the name of the buyer (302), and the basket ID (shown as Basket_ID) to identify the basket (303). The descriptions (304) of the items chosen by the buyer or a shopper are also shown, including the unit price (305), quantity (306), total unit price (307) of each item, and the total price (308) of all items. The buyer may remove items from the page by checking a check-box (309) next to an item and clicking on the "Remove Item(s)" button (312). Alternatively, the buyer may add items to the basket by clicking on the "Continue Shopping" button (311). Once the buyer is finished reviewing the items in the buyer's online shopping basket, the buyer clicks the "Proceed to Checkout" button (313) to pay for the items.

The buyer optionally may customize the basket (202, FIG. 2) with specific buyer rules that are associated with the unique basket ID by clicking on the "Customize Basket" button (310) of FIG. 3. For example, a buyer may allow an online shopper to purchase up to $100 of products in the educational book category only. Alternatively, the buyer can specify that no check out process for the basket is allowed by the shopper, and approval for a check out is required from the buyer.

The buyer may want to place specific items in the online shopping basket for the shopper (203, FIG. 2). This insures the buyer at least purchases those specific items for the shopper. Alternatively, the buyer could require as one of the buyer rules that the shopper choose specific items during the shopper's online shopping session. The online store then assigns the shopper a unique customer ID (e.g., Customer_ID2, Ms. Amber Smith, etc.) based on the buyer's input.

The shopper, using any one of a number of well-known Internet browsers, goes to the Internet address of the online store and is given the customized online shopping basket based on the shopper's unique customer ID (204), and the online store records the transfer of the basket to the shopper (i.e., carrier of Basket_ID1 is Customer_ID2). FIG. 4 is a diagram of a web page illustrating a shopper's online shopping basket. The shopper's basket has the same features as the buyer's basket, except the "Proceed to Checkout" button (313) of FIG. 3 is replaced with a "Notify Approver" button (413) to let the buyer know that the shopper has finished shopping.

The online shopping basket additionally may be customized with shopper rules by a shopper (205, FIG. 2) by clicking on the shopper's "Customize Basket" button (410). The shopper rules are checked to ensure no conflicts exist between any shopper rule and any buyer rule, and the shopper can specify a dependency between two or more products because the buyer may not understand or realize the required dependency. For example, the shopper may need batteries for items when they are not included. Accordingly, the shopper may require the online shopping basket to choose the correct type of batteries (i.e., D, C, AAA, etc.) for items that require batteries but are not included in the packaging.

The shopper then begins shopping and puts items into the online shopping basket as desired (206, FIG. 2). If the basket is customized with buyer or shopper rules, the rules are checked whenever a product is put into the basket.

Figure 5:
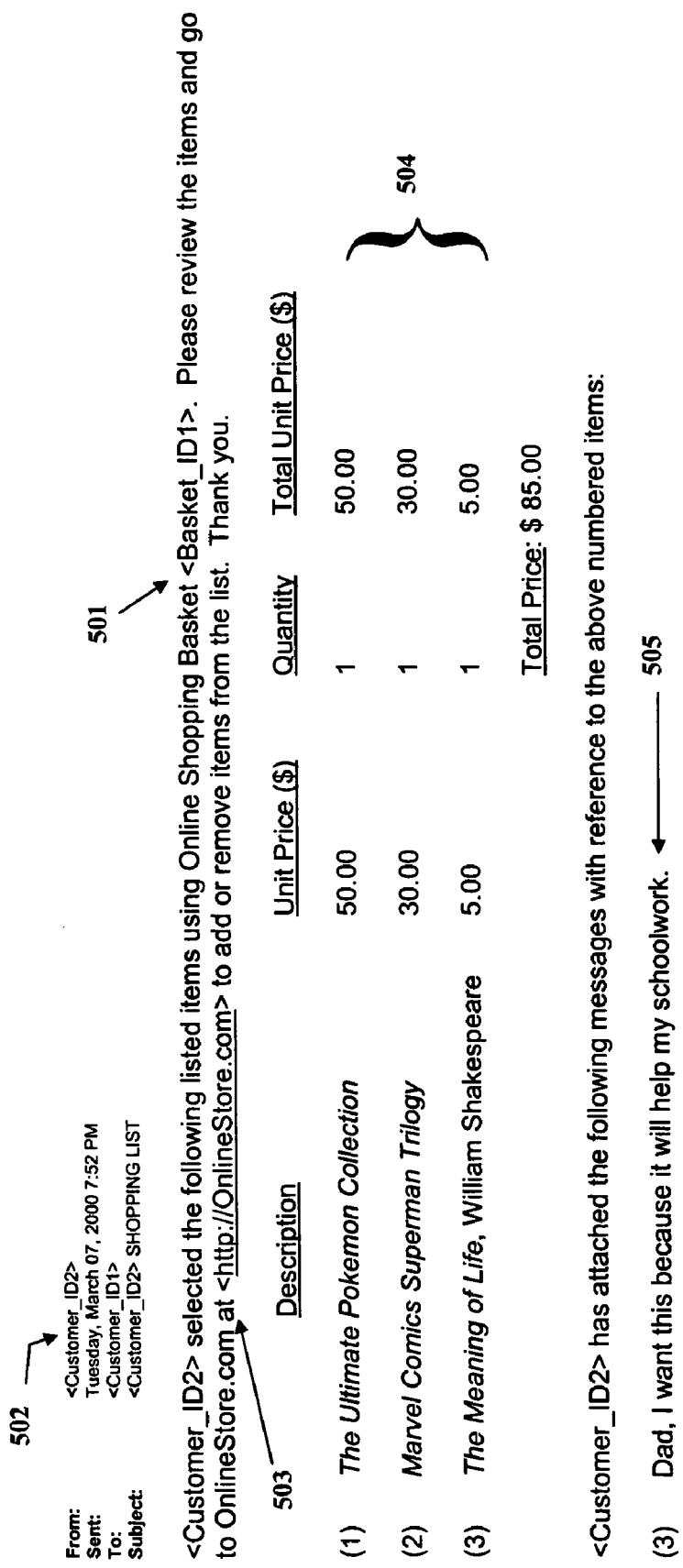
FIG. 5 is an illustration of an e-mail generated from a shopper's online shopping basket.

Once a shopper has finished shopping, the "Notify Approver" button (413) of FIG. 4 is clicked and an e-mail is sent from the server computer (103) to the buyer at client computer (101), notifying the buyer that the shopper has finished shopping and has returned the online shopping basket to the online store (207). FIG. 5 is an illustration of an e-mail generated by server computer (103) using the information in the shopper's online shopping basket, including the unique basket ID (e.g., Basket_ID1, Allan's basket_1, etc.) of the online shopping basket (501), the unique shopper's ID (e.g., Customer_ID2, Ms. Amber Smith, etc.) to identify the shopper (502), the URL or DNS of the online store (503), and a line item description of each item in the online shopping basket (504). The e-mail additionally may contain messages associated with a particular item from the shopper (505). For example, the shopper may attach a message to a particular line item to be read by the buyer, like "Mom, I want this because my friend in school has it" or "Dad, I want this because it will help my schoolwork."

After reviewing the contents of the e-mail, the buyer at client computer (101) goes to the URL or DNS of the online store at server computer (103) to add or remove items from the online shopping basket (208, FIG. 2) stored on the disk drive (130) of server computer (103). The buyer may remove items from the basket by checking the check-box (309) next to the item and by clicking on the "Remove Item(s)" button (312) on the buyer's online shopping basket web page of FIG. 3. Alternatively, the buyer may add items to the basket by clicking on the "Continue Shopping" button (311). If the buyer adds items to the basket, the buyer and shopper rules are executed to qualify the item(s) added by the buyer. If more shoppers need to shop other online stores, the foregoing process may be repeated for the shoppers (209, FIG. 2).

A buyer, thus, may have to review multiple online shopping baskets. The system of the present invention, however, merges all the online shopping baskets into a single online shopping basket (211, FIG. 2) before the buyer checks out, assuming multiple online shopping baskets exist to be merged (210, FIG. 2).

Figure 6:
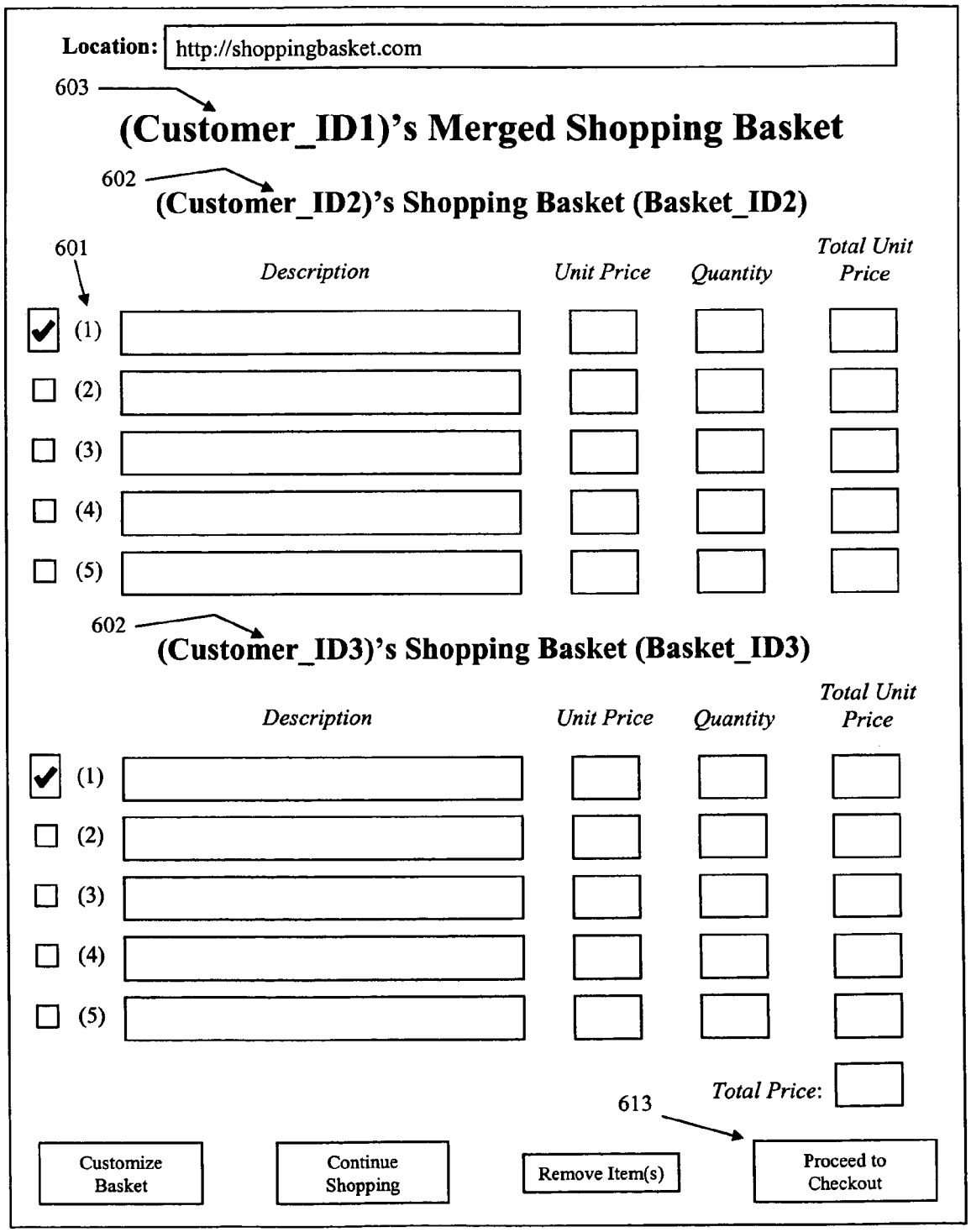
FIG. 6 is a diagram of a web page illustrating a merged online shopping basket.

FIG. 6 is a diagram of a web page illustrating a merged online shopping basket. The items (601) in the merged shopping basket are grouped according to the unique shopper IDs (602) to distinguish the items according to each shopper for the buyer (indicated as Customer_ID1 603), and the buyer (603) may remove or add items as previously described. Once the buyer is satisfied with the items (601) listed in the merged online shopping basket, the buyer proceeds to checkout by clicking with a mouse on the "Proceed to Checkout" button (613) of the merged online basket and pays for the items (212, FIG. 2).

Several advantages may be gleaned from the foregoing disclosure. First, shopping activities involving shoppers and buyers can proceed asynchronously at the convenience of different parties. For example, teenagers, young school children, or college students can shop online at home after school at their favorite Website while parents make their purchases after work. Second, the use of customizable baskets means buyers can preempt undesirable purchases of unapproved items by shoppers. Third, the transferring of all items from multiple online shopping baskets into a single merged basket is more economical when, for example, a discount for a large purchase is given or when shipping costs are reduced for a single shipment of goods. Fourth, online stores can customize their shopping baskets to provide better personalization between the stores and their customers, resulting in more cross-selling, up-selling, micro marketing, or other economically beneficial activities.

Accordingly, the present invention directly addresses the need to provide a convenient workflow between the two roles of e-commerce customers (i.e., buyers and shoppers). Different people may participate in putting items in a basket and checking items out for payment. The invention may also improve the basket-to-buy ratio.

It will be apparent to one of ordinary skill in the art that the embodiments as described above may be implemented in many different embodiments of software, firmware, and hardware in the entities illustrated in the figures. The actual software code or specialized control hardware used to implement the present invention is not limited to the present invention. The operation and behavior of the embodiments are described without specific reference to specific software code or specialized hardware components. Thus, a person of ordinary skill in the art would be able to design software and control hardware to implement the embodiments of the present invention based on the description herein.

The foregoing description of the preferred embodiments provides illustration and description of the present invention, but the description is not intended to be exhaustive or to limit the invention to the precise form disclosed. Modifications and variations of the invention consistent with the above teachings are possible and may be acquired from practice of the invention. Accordingly, the appended claims and any equivalents thereof define the scope of the present invention.

The appended claims do not have limitations phrased in the "means" or "step" (for performing a specified function) format permitted by 35 U.S.C. § 112, paragraph six. Accordingly, the appended claims are not to be interpreted under Section 112, paragraph six, as being limited solely to the structure, material, functions, or their equivalents described in the present application.

What is claimed:

1. A method comprising:
   creating a primary online shopping basket having an associated basket ID and a first unique customer ID;
   creating at least one secondary online shopping basket having a second unique customer ID;
   associating said at least one secondary basket with customer-defined rules that define purchasing requirements for items assigned to each of the secondary online shopping baskets;
   allowing entry into said at least one secondary online shopping baskets for selected items that satisfy the customer-defined rules;
   automatically merging by a programmed computer the at least one secondary shopping baskets into the primary online basket to create a merged online shopping basket and displaying contents of the merged online shopping basket on a single web page and being viewable at one time, before checkout of the items corresponding to the contents of the merged online shopping basket; and
   grouping the selected items in the merged online shopping basket according to customer IDs and displaying contents of the merged online shopping basket with the selected items in lists grouped according to customer IDs and being viewable at one time.

2. The method of claim 1, further including:
   illustrating the primary online shopping basket and the at least one secondary online shopping basket as a web page including a universal resource locater, the first customer ID, and the basket ID.

3. The method of claim 1, wherein the at least one secondary shopping basket includes a customer-defined rule identifying specific products which are required to be purchased by a shopper.

4. The method of claim 1, wherein the primary online shopping basket includes customer-defined rules that define purchasing requirements for items assigned to the primary online shopping basket and one of the customer-defined rules for the primary online shopping basket identifies that approval for checkout is required by a buyer.

5. The method of claim 1, wherein a customer-defined rule specifies a dependency between one of the selected items and a non-selected item in order to instruct a shopper to purchase the non-selected item.

6. A method comprising:
   creating a primary online shopping basket having an associated basket ID and a first unique customer ID;
   creating at least one secondary online shopping basket having a second unique customer ID;

associating said at least one secondary basket with customer-defined rules that define purchasing requirements for items assigned to each of the secondary online shopping baskets;

allowing entry into said at least one secondary online shopping baskets for selected items that satisfy the customer-defined rules;

automatically merging by a programmed computer the at least one secondary shopping baskets into the primary online basket to create a merged online shopping basket and displaying contents of the merged online shopping basket on a single web page, before checkout of the items corresponding to the contents of the merged online shopping basket, wherein the at least one secondary shopping basket includes a customer-defined rule identifying a price ceiling for a product category.

7. A system comprising:

a network; and a network server computer connected to a client computer through the network, the network server computer responding to requests from the client computer to:

associate a primary online shopping basket and at least one secondary online shopping basket with customer-defined rules that define purchasing requirements for items within online shopping baskets, the online shopping baskets including the primary online shopping basket and the at least one secondary online shopping basket;

associate a first customer ID for the primary online shopping basket and a second unique customer ID for the at least one secondary online shopping basket;

determine whether selected items selected for entry into the online shopping baskets satisfy the customer-defined rules;

allow entry into the online shopping baskets of the selected items that satisfy the customer-defined rules;

automatically merge at least one secondary online shopping basket into the primary online shopping basket to create a merged online shopping basket and display contents of the merged online shopping basket on a single web page and being viewable at one time before checkout of the selected items in the merged online shopping basket; and group the items in the merged online shopping basket according to customer IDs and display the contents of merged online shopping basket in lists grouped according to customer IDs and being viewable at one time.

8. A program code storage device, comprising:

a machine-readable storage medium;

machine-readable program code, stored on the machine-readable storage medium, having instructions, which when executed cause a server to create a primary online shopping basket having an associated basket ID and a first unique customer ID;

create at least one secondary online shopping basket having a second unique customer ID;

associate the primary online shopping basket and the at least one secondary online shopping basket with customer defined rules that define purchasing requirements for items assigned to the primary online shopping basket or the at least one secondary online shopping basket;

allow entry into the at least one secondary online shopping basket for selected items that satisfy the customer-defined rules;

automatically merge the at least one secondary online shopping basket into the primary online shopping basket to create a merged online shopping basket and display contents of the merged online shopping basket on a single web page and being viewable at one time, before checkout of the items corresponding to the contents of the merged online shopping basket; and group the items in the merged online shopping basket according to customer IDs and display the contents of the merged online shopping basket in lists grouped according to customer IDs and being viewable at one time.

9. The program code storage device of claim 8, wherein the at least one secondary shopping basket includes a customer-defined rule identifying specific products that are required to be purchased by a shopper.

10. The program code storage device of claim 8, wherein a customer-defined rule specifies a dependency between one of the selected items and a non-selected item in order to instruct a shopper to purchase the non-selected item.

11. A program code storage device, comprising:

a machine-readable storage medium;

machine-readable program code, stored on the machine-readable storage medium, having instructions, which when executed cause a server to create a primary online shopping basket having an associated basket ID and a first unique customer ID;

create at least one secondary online shopping basket having a second unique customer ID;

associate the primary online shopping basket and the at least one secondary online shopping basket with customer defined rules that define purchasing requirements for items assigned to the primary online shopping basket or the at least one secondary online shopping basket;

allow entry into the at least one secondary online shopping basket for selected items that satisfy the customer-defined rules; and automatically merge the at least one secondary online shopping basket into the primary online shopping basket to create a merged online shopping basket and display contents of the merged online shopping basket on a single web page, before checkout of the items corresponding to the contents of the merged online shopping basket, wherein the at least one secondary online shopping basket includes a customer-defined rule identifying a price ceiling for a product category.

12. A method comprising:

creating multiple primary online shopping baskets, each having an associated basket ID and a first unique customer ID;

creating a plurality of secondary online shopping baskets, wherein each of the secondary online shopping baskets is associated with a second unique customer ID;

associating at least one of the plurality of secondary online shopping baskets with customer-defined rules that define purchasing requirements for items assigned to the at least one secondary online shopping baskets;

allowing entry into the at least one secondary online shopping basket of the selected items that satisfy the customer-defined rules;

automatically merging by a programmed computer the at least one secondary shopping basket into a primary online basket to create a merged online shopping basket and displaying contents of the merged online shopping basket on a single web page and being viewable at one time before checkout of the items corresponding to the contents of the merged online shopping basket, wherein one of the plurality of secondary online shopping baskets includes a customer-defined rule identifying specific products that are required to be purchased by a shopper; and grouping the contents in the merged online shopping baskets according to customer IDs and displaying the contents of the merged online shopping basket in lists grouped according to customer IDs and being viewable at one time.

\* \* \* \* \*